United States Patent [19]

Marchant

[11] 4,300,311
[45] Nov. 17, 1981

[54] HYDROPONIC IRRIGATION VALVE AND SYSTEM

[76] Inventor: Wayne Marchant, 800 E. 14th St., Oakland, Calif. 94606

[21] Appl. No.: 156,656

[22] Filed: Jun. 5, 1980

[51] Int. Cl.³ .............................................. A01G 31/00
[52] U.S. Cl. ............................................ 47/62; 47/79; 137/430
[58] Field of Search ................................. 47/59–65, 47/79; 137/422, 430, 389

[56] References Cited

U.S. PATENT DOCUMENTS

| | | | |
|---|---|---|---|
| 1,067,102 | 7/1913 | Failing | 137/430 X |
| 1,245,893 | 11/1917 | Farrell | 137/430 X |
| 1,968,293 | 7/1934 | Gould | 137/430 X |
| 2,060,735 | 11/1936 | Krueger | 47/62 |
| 3,095,005 | 6/1963 | Thompson | 137/430 |
| 3,892,982 | 7/1975 | Holmes | 47/62 X |

*Primary Examiner*—Robert E. Bagwill
*Attorney, Agent, or Firm*—Manfred M. Warren; Robert B. Chickering; Glen R. Grunewald

[57] ABSTRACT

A valve for controlling the level of solution in a plant container of a hydroponic irrigation system is disclosed. The valve includes a chamber having a top wall with an opening for the passage of liquid therethrough and having an inlet port below the top wall. Hydroponic irrigation solution is pumped into the container by way of the inlet port. A closure member within the chamber is moveable into a position blocking the flow of liquid through the opening by a lost-motion connection to a float and is held in its blocking position, so long as the pump continues to operate, by the pressure of the liquid in the chamber.

10 Claims, 4 Drawing Figures

HYDROPONIC IRRIGATION VALVE AND SYSTEM

BACKGROUND OF THE INVENTION

The present invention relates to a valve for controlling the level of liquid pumped into a vessel and is more particularly directed to apparatus for controlling the circulation of hydroponic solution to and from containers for plants.

In the hydroponic method of cultivation plants are raised in a soil-free environment by means of periodic exposure of the plant root systems to a hydroponic solution containing nutrients, pesticides, fungicides and the like. The plants are typically supported in a container by burying the root systems in an inert medium such as gravel, and the necessary nutrients for plant growth are provided by intermittently flooding or flushing the root systems with hydroponic solution for a controlled, usually short, period of time.

Hydroponic irrigation systems could be especially useful for maintaining decorative plants in homes or in commercial establishments such as restaurants and offices. They have heretofore been rarely used in these settings, however, because of the particular difficulties encountered in circulating the hydroponic solution. Such systems must be capable of serving containers of different sizes, located at different elevations in arrangements dictated by aesthetic appeal. Each container must be filled with hydroponic solution to its own predetermined level and then drained shortly thereafter. The filling and draining of the plant receptacles in this manner must be repeated on a regular basis. Furthermore, it is desirable for decorative use in commercial establishments not primarily concerned with plant cultivation that the system be capable of operating for extended periods with low maintenance and little supervision. In fact, the capability of a system to provide maintenance-free plant receptacles allows the placing of hydroponically grown plants in inaccessible areas, such as under skylights or suspended from ceilings, where even the weekly or semi-weekly watering of conventionally grown plants would be difficult.

Hydroponic irrigation systems for use in the aforementioned settings are presently prohibitively expensive because each plant container must be provided with its own pump and level control. Otherwise plant containers that fill quickly, such as those having small volume or those located close to the reservoir or at lower elevations, will overflow before containers that fill more slowly are adequately flooded with hydroponic solution. Although prior art devices have been developed to regulate the circulation of hydroponic solution, none adequately solves the aforementioned problems peculiar to decorative plant displays.

SUMMARY OF THE INVENTION

The present invention relates to a level control valve and to a simple and inexpensive hydroponic irrigation system employing that valve. The irrigation system is capable of operating for extended periods of time with little or no maintenance, and it is suitable for applications ranging from large-scale commercial installations to small-scale decorative plant displays. The irrigation system of this invention may employ a single pump and reservoir to maintain any number of plants in containers of different size and located at any position or elevation. The invention includes in its broadest aspect a valve for controlling the liquid level in a vessel even though the pump supplying liquid to the vessel remains in operation after the vessel is filled and after the pump stops providing for draining the vessel. The valve is comprised of a lifting rod with a closure member fixed to a lower portion and intercepting means fixed to an upper portion thereof. The valve is further comprised of a valve chamber having a top wall with a first opening for the passage of liquid therethrough and a second opening through which the rod slidably extends. The closure member is vertically displaceable within the chamber and positioned to block the flow of liquid through the top wall when in its uppermost position. The valve chamber has a side wall with an inlet port positioned below the top wall a distance greater than the thickness of the edge of the closure member.

A float is positioned to move vertically above the top wall and is adapted to engage the intercepting means at an upper position in the vertical movement of the float. The closure member is moveable into its uppermost position, after the float has reached its uppermost position, by a lost-motion connection with the float. In operation the closure means is urged through its final lost-motion span into its closed position by the pressure of the liquid flowing into the valve chamber through the inlet port.

Another aspect of the invention comprises the above-described valve mounted in a plant receptacle. A reservoir for retaining hydroponic solution is positioned below the receptacle, and a conduit provides for continuous passage of the solution between the reservoir and the inlet port of the valve. A non-positive-displacement pump is provided for transporting the solution through the conduit to the inlet port. The pump cooperates with the valve to fill the receptacle to its predetermined level, and the valve operates to return the solution to the reservoir automatically once the pump is disengaged.

Other applications, features and advantages will appear from the following description of a preferred embodiment and the accompanying drawings.

DETAILED DESCRIPTION OF PREFERRED EMBODIMENTS

Figure 1:
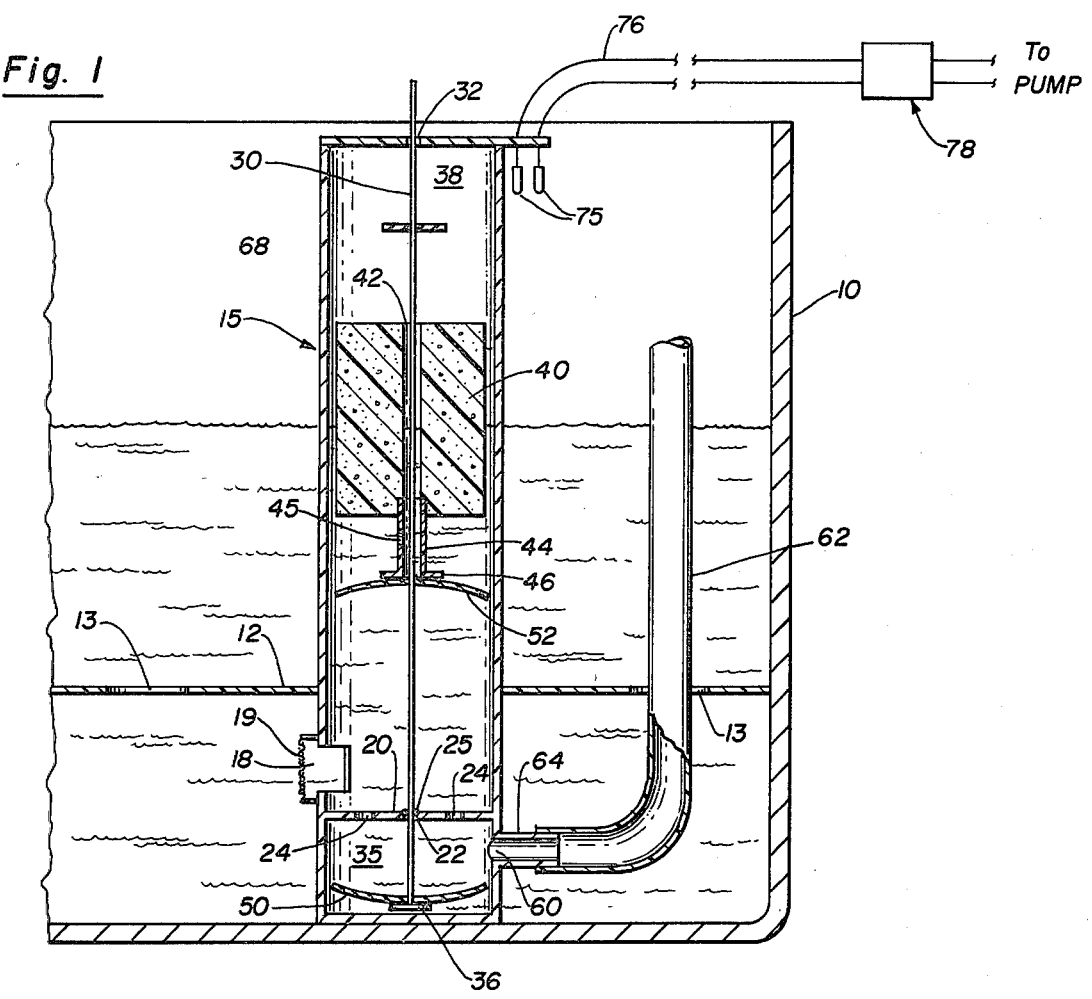
FIG. 1 is a fragmentary sectional view of the valve mounted in a vessel and showing the float in an intermediate position.

Referring now to FIG. 1, a valve housing 15 is shown mounted in a pot 10, partially shown, such as is used with house plants. The housing 15 is secured in its position by a partition 12 through which the housing extends and which fits snugly in a lower portion of the pot 10. The partition 12 contains apertures illustrated at 13 for communication of the portions of the pot separated by the partition. Other ways of mounting the valve in this and differently shaped containers will, of course, occur to one skilled in the art. The valve housing 15 is generally of cylindrical shape, although other shapes may be used, and can be constructed of plastic, metal or any other rigid material which is non-corrodable and non-toxic in the valve environment. Inexpensive plastic materials may be used, thereby reducing the overall cost of manufacture.

Figure 3:
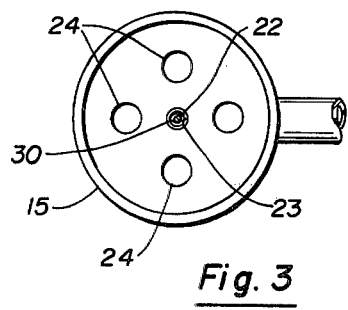
FIG. 3 is a horizontal sectional view of the valve taken through the plane 3—3 of FIG. 1.

The valve housing 15 contains a horizontal partition or wall 20 separating a lower valve chamber 35 from an upper float chamber 38. An inlet port 60 is located below the horizontal wall 20 in that portion of the housing 15 forming a side wall of the valve chamber 35, and a nipple 64 is provided for connecting a length of flexible tubing 62 to the inlet port. The top wall 20 of the valve chamber 35 contains one or more apertures 24 (see FIG. 3) for communication of the valve chamber with the float chamber. The float chamber also contains an opening 18 located just above the top wall 20 for communication of the float chamber with the interior of the container 10. Thus, a continuous path is provided whereby liquid supplied by the tubing 62 can enter the valve chamber 35 through inlet port 60 and pass through apertures 24 in the top wall 20 into the float chamber 38 and through the opening 18 to fill the container 10. The same path is followed in reverse when draining the container of liquid. To prevent the various apertures and orifices of the valve mechanism from becoming clogged by foreign matter or debris in the plant container, it is advantageous to cover the opening 18 by a wire mesh 19 or other such filtering means.

To halt the flow of liquid from the valve chamber into the container, a vertically movable closure member 50 is provided within the valve chamber 35. The vertical displacement of the closure member is effected by movement of a lifting member comprised of a straight rigid rod 30 extending vertically from the valve chamber to the float chamber and passing through a central aperture 22 in the separating wall 20. The closure member is retained on the rod 30 by a flange 36 as shown in FIG. 1. To guide the rod 30 in its vertical motion, the upper end of the rod slidably extends through an aperture 32 at the top of the float chamber 38. Contained in the float chamber is a float 40 having a vertical central bore 42 through which the rod 30 extends. Fixed on the rod 30 in a position above the float is an intercepting means in the form of a flange 68 formed of a resiliently flexible rubber-like material which engages the rod with enough friction to be difficult to move. The frictional contact of the flange 68 and the rod 30 permits manual adjustment of the flange position merely by sliding the flange to a new position, but the friction is sufficient to prevent the flange 68 from being moved by force exerted by float 40. The top of the valve housing 15 may be removable to facilitate such adjustment.

In operation liquid is pumped through the tubing 62 into the valve chamber through the openings 24 in the top wall 20 into the float chamber 38 and through the opening 18 into the container. As the container fills, the float 40 rises until it is intercepted by the flange 68. FIG. 1 shows the float in an intermediate position before it engages the intercepting flange 68. Throughout the initial rise of the float the closure member 50 rests in the valve chamber at a position below the inlet port 60.

Figure 2:
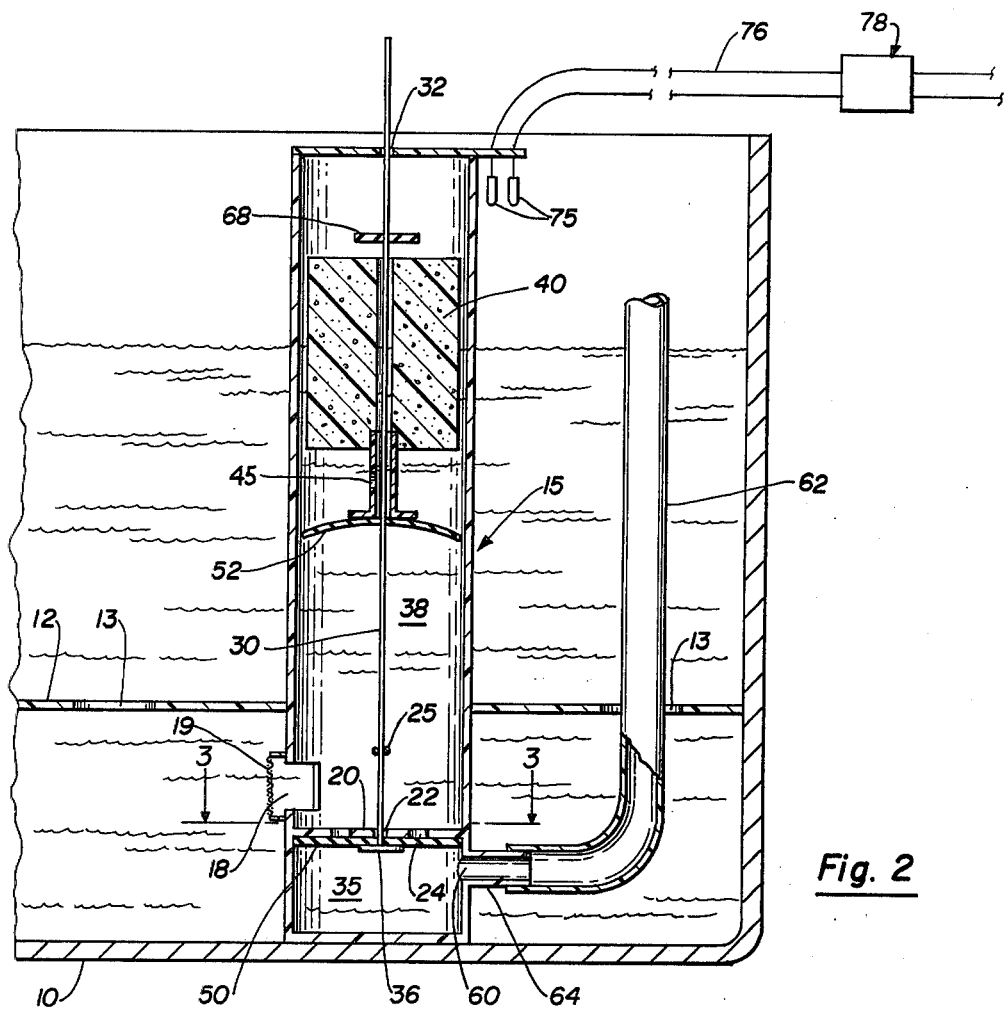
FIG. 2 is a fragmentary sectional view of the valve showing the float and the lower closure member in their uppermost positions.

After the float engages the flange 68, it carries the rod 30 with it in its upward motion thereby raising the closure member 50. The float continues to rise until the closure member is carried to a position in which its edge is above the inlet port in the side wall of the valve chamber, i.e., in which a substantial portion of the bottom side of the closure member is exposed to the flow of liquid though the inlet port. At this point the closure member 50 is urged upward against the top wall by the pressure of the liquid streaming into the valve chamber, thereby blocking the flow of liquid through the top wall and into the container. The central bore 42 provides for a lost-motion connection between the float 40 and the lifting rod 30 with attached closure member 50 whereby the closure member can be urged upward into sealing engagement with the top wall without carrying the float along with it. FIG. 2 shows a filled container with the closure member in its uppermost position and the float in its uppermost position.

So long as a pump continues to keep the liquid in the valve chamber under pressure, the closure member will be held in its blocking position. Clearly, a pump of the positive displacement type cannot be used without damage to the valve or to the pump. Only pumps capable of continued operation after the valve chamber is closed (e.g., centrifugal pumps) can be used with the present valve. Such pumps are herein referred to as non-positive-displacement pumps with no limitation to centrifugal pumps being intended.

When the pump stops and, correspondingly, the upward pressure of the liquid against the closure member drops, the closure member and lifting rod will fall slightly thereby breaking the seal against the top wall and allowing the liquid in the container to flow out through the tubing 62 either by a syphoning action over the rim of the container or by draining through the bottom of the container.

In order that the closure member respond to the pressure of the liquid as indicated above, it is critical that the inlet port 60 be spaced beneath the top wall 20 at least a distance greater than the thickness of the edge of the closure member 50. Furthermore, it has been found advantageous to form the closure member in a saucer-like shape and of a resilient and fairly flexible rubber-like material. Other shapes employing a resilient and flexible material, however, have also been found to work.

With this embodiment of the control valve of the present invention, then, a plant receptacle can be filled with irrigation liquid, such as water or nutrient-containing solution, to a level predetermined by the position at which the intercepting flange 68 is set. The pump is run for a sufficient period of time to give the plant roots a thorough soaking. At this point the pump is disengaged, thereby relaxing the closure member 50 and allowing the liquid to drain from the container through the tube 62 and through the pump. The liquid will drain out under the action of gravity through the same line through which it was introduced.

A problem can arise when simultaneously draining several plant-containing receptacles disposed at different heights by a syphoning action into a common conduit; viz., depending on the location of the joints connecting the individual tubes 62 coming from each valve to the common conduit, the syphon of a lower receptacle can be broken if a higher receptacle empties first. For this reason in some applications it is desirable to add a second closure member 52 to block the flow of liquid into the valve chamber through the wall 20 when the float is in its lowermost position. In this way the valve chamber 35 and supply tube 62 always remain filled with liquid. To be sure, a small amount of liquid will remain in the bottom of the container, but only at a depth below the plant root system and, accordingly, will not interfere with the irrigation cycle. The second closure member 52 is best formed similarly to closure member 50 in an inverted saucer-like shape and flexible, resilient rubber-like material. It has a small central aperture through which the rod 30 slidably extends and is secured to the bottom of the float 40 by means of a tubular coupling 44. One end of the coupling is fixed to the bottom of the float in line with the central bore 42 so that the central bore and the tubular coupling together form a straight passageway through which the rod 30 passes. The other, lower end of the coupling 44 has a flange 46 providing a surface to which the second closure member 52 is secured. Thus, the float 40, coupling 44 and second closure member 52 are freely slidable as a unit in the vertical direction. As liquid drains from the container and the float unit is lowered, the second closure member will come into contact with the wall 20, blocking the flow of liquid therethrough.

To provide a better seal around the central aperture 22 of the wall 20, a small o-ring 25 is carried by the rod 30 above the wall 20. The o-ring is positioned on the rod such that it rests on the wall 20 blocking the central aperture 22 when the lower closure member 50 is in its lowermost position beneath the inlet port 60. In fact, this lowermost position may be set by adjusting the position of the o-ring 25 on the rod 30. To provide for better sealing action, the top edge of the aperture 22 is countersunk as indicated at 23 in FIG. 3 for receipt of the o-ring 25.

To provide continuous access of the liquid to the central bore region of the float, a lateral port 45 is disposed in the tubular coupling. Liquid entering through the port 45 and to some extent through the central aperture of the second closure member 52 serves to lubricate the float unit as it slides on the rod and to prevent the formation of air pockets in the central bore and consequently changes in the buoyancy of the float.

Although the valve of the present invention is designed to control the filling of a container only to a predetermined level, malfunctions can always occur. To allow for such a contingency, safety means have been incorporated into the present invention to disengage the pump should the liquid accidently rise above the predetermined level. The safety means include an opto-isolater controlled relay 78 acting as a photo-isolated switch for disengaging the pump. The normally closed side of the relay is electrically connected to the pump power supply. The normally open side of the relay is connected by means of electrical wires 76 to a sensor comprised of two tabs 75 secured within the plant receptacle in a position somewhat above the predetermined level. In FIG. 1 the tabs are supported by a projecting lip at the top of the valve housing 15. The tabs, however, could be supported by other means on the housing 15 or on the container 10. If for some reason the liquid should rise above the predetermined cutoff level, the liquid will then contact the sensor tabs 75, thereby energizing the opto-isolator and causing the normally open side of the relay to close. This in turn causes the normally closed side of the relay to open, interrupting power to the pump. The normally open relay circuit is powered by a low-voltage, low-current supply which presents no electrical hazard. The higher-voltage pump supply is photo-isolated from the container and liquid therein and, hence, presents no electrical hazard.

Figure 4:
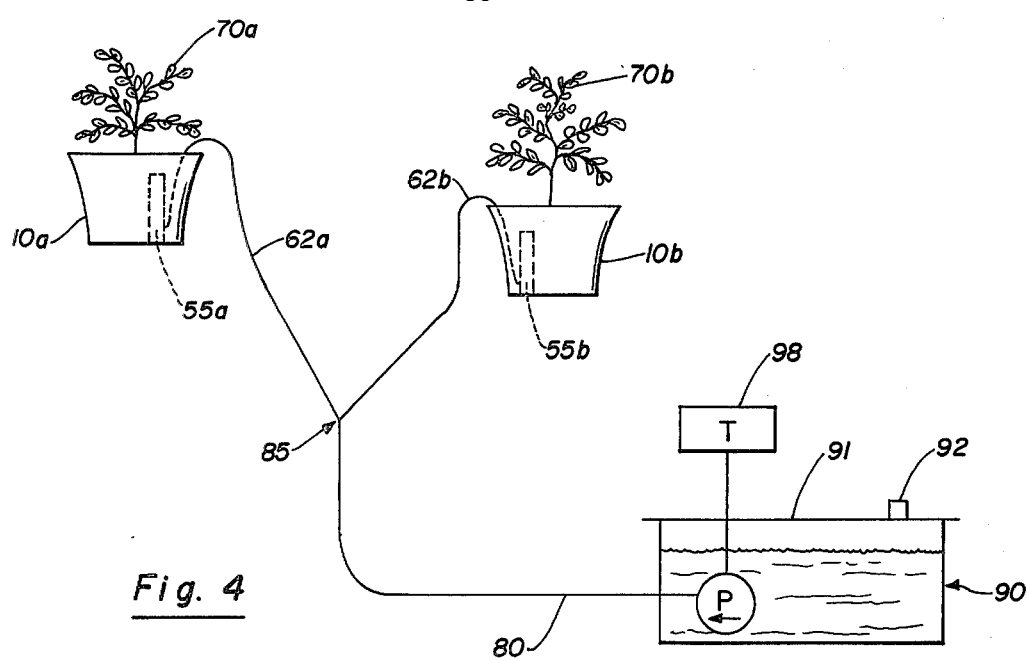
FIG. 4 shows an arrangement of a hydroponic irrigation system for use with decorative house plants.

A hydroponic irrigation system employing the above-described control valve includes one or more plant receptacles, each containing at least one valve. The receptacles themselves may be individual flower pots as found in the home or may include larger containers capable of holding several plants each, as may be found in some commercial applications such as restaurants or office waiting rooms. FIG. 4 shows a typical embodiment of the hydroponic irrigation system of the present invention including two flower pots 10a and 10b. Each pot contains a thriving plant 70a or 70b and a control valve 55a or 55b. The inlet ports of the control valves are connected to feed conduits 62a and 62b, which in turn are connected to a main supply conduit 80. In FIG. 4 the main and feed conduits are joined by a Y-coupling 85; however, other coupling means well known in the prior art may be used to accomodate any number of feed conduits. The conduits themselves can be formed of a wide variety of metal or plastic materials capable of resisting corrosion or other deterioration from the hydroponic solution. Furthermore, the conduits can take the form of flexible tubing, rigid piping or some combination thereof. A reservoir 90 for retaining the hydroponic solution is in communication with the main conduit 80. As shown in FIG. 4, the main conduit 80 is connected to the outlet of a submersible pump 95 located within the reservoir 90. The reservoir preferably has a cover 91 with fill spout 92 to prevent debris from falling into the hydroponic solution. The various containers of the system may be positioned in any relation to one another; the reservoir, however, must be positioned below all of the containers.

In practice the pump is operated to fill the plant receptacles to their predetermined levels. A plant container will take on solution until its control valve shuts off the supply to that container, other containers being allowed to continue filling. In this way a system having a single reservoir and pump can accomodate a number of containers of different sizes being supplied by feed conduits of different diameters. The pump is operated for sufficient time to fill all the containers and to give the root systems a thorough soaking in hydroponic solution. The pump is then switched off, thereby causing the control valves to open and the hydroponic solution to drain back to the reservoir. Thus, it is necessary that the reservoir be positioned at a level lower than the plant containers and that the conduits provide a continuous passage from the plant containers to the reservoir. Although in FIG. 4 the main conduit 80 drains through the submersible pump 95, other pump arrangements, e.g., employing non-submersible pumps, may be used so long as a continuous passageway to the reservoir for gravity-induced drainage is provided. If drainage is through the pump, a positive displacement pump cannot be used.

To control the repetition of the fill-drain cycle, the pump may be operated by a timer 98 for automatically engaging and disengaging the pump at preset intervals. In this way the system becomes fully automatic and can be left unattended except for occasionally recharging the reservoir with fresh hydroponic solution.

In application the present irrigation system will generally require only one reservoir and one pump for a large number of plants. The reservoir may be conveniently located in a basement or some other spot remote from the plants themselves. The use of inexpensive flexible tubing for the conduits allows one easily to rearrange the disposition of the containers or to add more containers without great expense. In a typical commercial operation, for example, a large drum can be sunk in the ground to serve as the reservoir. A main conduit can lead to a multi-tap coupling member, to which individual feed conduits may be connected as needed. Thus, the system may quickly, easily and cheaply be expanded or contracted as needed.

The present system can also be applied advantageously to plants packed in gravel for shipping. Each shipping container can affordably be furnished with a valve of the present invention, thereby enabling unsupervised irrigation of the plants while en route.

Clearly, other applications of the present irrigation system and similar uses of the present valve will occur to those skilled in the art.

What is claimed is:

1. A valve for use in a vessel to control the filling of the vessel with liquid to a predetermined level and the draining thereof, comprising:
   A. a lifting rod having
      i. a closure member fixed to a lower portion of said rod, and
      ii. intercepting means fixed to an upper portion of said rod;
   B. a valve chamber having
      i. a top wall with
         a. a first opening for passage of said liquid and
         b. a second opening with said lifting rod slidably extending therethrough, and
      ii. a side wall having an inlet port positioned below said top wall a distance greater than the thickness of the edge of said closure member; and
   C. a float positioned to move vertically above said top wall and adapted to engage said intercepting means at an upper position in the vertical movement of said float, said closure member being moveable into its uppermost position to seal said first opening, after said float has reached its uppermost position, by a lost-motion connection with said float.

2. A valve as defined in claim 1 wherein said closure member comprises a resiliently flexible saucer-shaped membrane, unconfined at its periphery and secured at its center to said rod.

3. A valve as defined in claim 1, wherein said rod slidably passes through a vertical central bore in said float and said intercepting means comprises a flange secured to said rod at an adjustable position above said float.

4. A valve as defined in claim 3, wherein a second closure member is fixed to the bottom of said float and positioned to block the flow of liquid through said top wall when said float is in its lowermost position.

5. A valve as defined in claim 4, wherein said second closure member is fixed to a tubular coupling fixed to the bottom of said float and coaxial with said rod, said coupling having a lateral port to allow flow of liquid to said central bore.

6. A valve as defined in claim 4, wherein an o-ring is fixed to said rod between said top wall and said second closure member, said second opening being countersunk to receive said o-ring in sealing engagement when said rod is in its lowermost position.

7. a hydroponic irrigation system comprising:
   A. a plant receptacle for receiving hydroponic solution;
   B. a valve as defined in claim 1, mounted within said receptacle;
   C. a reservoir for retaining said solution, said reservoir being positioned below said plant receptacle;
   D. a conduit providing for continuous passage of said solution between said reservoir and said inlet port; and
   E. a non-positive-displacement pump for transporting said solution through said conduit to said inlet port, wherein said pump coacts with said valve to fill said receptacle to said predetermined level and said valve operates to return said solution to said reservoir upon disengagement of said pump.

8. A hydroponic irrigation system as defined in claim 7, further comprising a timer for automatically engaging and disengaging said pump at intermittent intervals.

9. A hydroponic irrigation system as defined in claim 7, further comprising safety means included in said receptacle for automatically disengaging said pump when said solution rises above said predetermined level.

10. A hydroponic irrigation system as defined in claim 9 wherein said safety means comprises a relay controlled by an opto-isolator; and a sensor mounted in said receptacle above said predetermined level and electrically connected to energize said opto-isolator when said solution contacts said sensor thereby operating said relay to interrupt power to said pump.

* * * * *